US010458296B2

(12) United States Patent
Pegg et al.

(10) Patent No.: US 10,458,296 B2
(45) Date of Patent: Oct. 29, 2019

(54) CRANKCASE OIL CATCHER WITH AN APERTURE AND SEAL

(71) Applicant: Ford Global Technologies, LLC, Dearborn, MI (US)

(72) Inventors: Ian Graham Pegg, Chelmsford (GB); Roland Paul Stark, Hitchin (GB)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 15/489,628

(22) Filed: Apr. 17, 2017

(65) Prior Publication Data

US 2017/0321579 A1 Nov. 9, 2017

(30) Foreign Application Priority Data

May 3, 2016 (GB) .................................. 1607649.9

(51) Int. Cl.
| | | |
|---|---|---|
| *F01M 11/00* | (2006.01) | |
| *F16C 3/14* | (2006.01) | |
| *F16C 7/02* | (2006.01) | |
| *F16C 9/02* | (2006.01) | |
| *F01M 11/02* | (2006.01) | |

(52) U.S. Cl.
CPC ........... *F01M 11/0004* (2013.01); *F16C 3/14* (2013.01); *F01M 2011/005* (2013.01); *F01M 2011/0033* (2013.01); *F01M 2011/0054* (2013.01); *F01M 2011/0091* (2013.01); *F01M 2011/023* (2013.01); *F16C 7/02* (2013.01); *F16C 9/02* (2013.01)

(58) Field of Classification Search
CPC ....... F01M 11/0004; F01M 2011/0016; F01M 2011/0033; F01M 2011/0037; F01M 2011/0045; F01M 2011/0054; F02F 7/0021; F16C 3/14; F16C 7/02; F16C 9/02

See application file for complete search history.

(56) References Cited

U.S. PATENT DOCUMENTS

2015/0252697 A1* 9/2015 Pegg .................. F01M 11/0004
123/41.42

FOREIGN PATENT DOCUMENTS

| DE | 19812464 A1 | 10/1998 | |
|---|---|---|---|
| EP | 2333258 A1 | 6/2011 | |
| GB | 2437089 A | 10/2007 | |
| GB | 2512893 A | 10/2014 | |
| GB | 2524013 A | 9/2015 | |
| WO | 2009004475 A2 | 1/2009 | |
| WO | 2016081780 A1 | 5/2016 | |
| WO | WO-2016081780 A1 * | 5/2016 | ............ F02F 7/0087 |

OTHER PUBLICATIONS

Intellectual Property Office of Great Britain, Combined Search and Examination Report Issued in Application No. GB1607649.9, dated Jul. 21, 2016, South Wales, 9 pages.

* cited by examiner

*Primary Examiner* — Jacob M Amick
(74) *Attorney, Agent, or Firm* — Geoffrey Brumbaugh; McCoy Russell LLP

(57) ABSTRACT

A crankcase oil catcher, the crankcase oil catcher comprising one or more surfaces configured to catch dispersed oil in a crankcase and direct the oil along the surfaces of the crankcase oil catcher away from a crankcase casing wall and towards a crank sump.

20 Claims, 4 Drawing Sheets

CRANKCASE OIL CATCHER WITH AN APERTURE AND SEAL

CROSS REFERENCE TO RELATED APPLICATION

The present application claims priority to Great Britain Patent Application No. 1607649.9, filed on May 3, 2016. The entire contents of the above-referenced application are hereby incorporated by reference in its entirety for all purposes.

FIELD

The present disclosure relates to a crankcase oil catcher, in particular, but not exclusively, a crankcase oil catcher configured to catch dispersed oil in a crankcase and direct the oil towards a crank sump and away from a crankcase casing wall.

BACKGROUND

During warm up of an internal combustion engine, the engine block structure acts as a large heat sink because the thermal inertia of the engine block structure is an order of magnitude greater than the coolant and oil. As a result, the engine block structure takes longer to warm up than the oil.

By way of example, hot oil returning from a piston cooling gallery, which has been heated by the combustion events, may hit a crank of the engine and the oil may be thrown against the cooler crankcase. When the oil is thrown against the crankcase wall, the oil loses heat due to the large thermal inertia of the crankcase and the large surface area of the crankcase. Similarly, oil returning from the cylinder head has been heated and loses heat as it returns through the engine block to the oil sump. The resulting colder oil has a higher viscosity, which leads to higher friction losses. This in turn leads to worse fuel consumption and cabin heating.

The present disclosure seeks to address these issues.

STATEMENTS OF INVENTION

According to an aspect of the present disclosure there is provided a crankcase oil catcher configured to be provided above a crankshaft of an engine and below an associated piston, the crankcase oil catcher comprising: one or more surfaces configured to catch dispersed oil in a crankcase and direct the oil along the surfaces of the crankcase oil catcher away from a crankcase casing wall and towards a crank sump; a first aperture for a connecting rod of the associated piston to pass through; and a seal provided around the first aperture, wherein the seal is configured to seal against the crankcase casing wall around an opening into an engine cylinder in which the associated piston resides and provide a seal between the engine cylinder and a gap between the crankcase oil catcher and the crankcase casing wall, wherein the crankcase oil catcher further comprises one or more fixing mounts that span the gap.

The crankcase oil catcher may comprise a first lip disposed about the first aperture, e.g. about an edge defining the first aperture. The first lip may at least partially form the seal. The first lip may contact the crankcase casing wall. The first lip may protrude form a top surface of the crankcase oil catcher. The first lip may protrude in a direction towards the piston.

The crankcase oil catcher may comprise a sealant applied around the first aperture, e.g. about an edge defining the first aperture. The sealant may at least partially form the seal. The sealant may contact the crankcase casing wall.

The sealant may be applied onto the first lip. The sealant and lip may together form the seal.

The width of the first aperture in a direction perpendicular and/or parallel to a longitudinal axis of the crankshaft may be equal to or greater than the corresponding width of the associated engine cylinder.

The crankcase oil catcher may be configured to be spaced apart from the crankcase casing wall. The crankcase oil catcher may be configured to substantially follow the contour of the crankcase casing wall. The crankcase oil catcher may be configured to substantially follow the contour of the crankcase casing wall in a plane perpendicular to a longitudinal axis of the crankshaft extending through the crankcase. A gap between the crankcase casing wall and the crankcase oil catcher may be between approximately 4 and 10 mm.

The crankcase oil catcher may be configured to be provided for a single cylinder of an engine. In other words, one crankcase oil catcher may be provided per piston. The crankcase oil catcher may be configured to be provided between walls between neighbouring cylinders of an engine. However, it is also envisaged that the crankcase oil catcher may extend beneath a plurality of pistons.

The crankcase oil catcher may comprise a bottom surface. The bottom surface may face the crankshaft. The bottom surface may be configured to catch oil dispersed by a crankshaft, by a connecting rod and/or by a bearing between the crankshaft and the connecting rod. The crankcase oil catcher may comprise a top surface. The top surface may face the piston. The top surface may be configured to catch oil returning from above the crankcase, e.g. from a piston cooling gallery, a cylinder head or any other source of oil.

The crankcase oil catcher may comprise one or more second lips. The second lips may be provided on one or more edges of the crankcase oil catcher surfaces, e.g. on top and/or bottom surfaces of the crankcase oil catcher. The second lips may protrude above the top surface and/or below the bottom surface. The one or more second lips may be provided on edges of the crankcase oil catcher surfaces adjacent to the walls between neighbouring cylinders of the engine. The one or more second lips may be provided on edges of the crankcase oil catcher surfaces substantially perpendicular to a longitudinal axis of a crankshaft extending through the crankcase.

The crankcase oil catcher may be made from a thermally insulating material. For example, the crankcase oil catcher may be made at least in part from a plastics material, such as nylon. The crankcase oil catcher may be made at least in part from a closed cell foam material. The crankcase oil catcher may be connected to the crankcase casing wall via one or more thermally insulating couplings. Such couplings may be made from a plastics material, e.g. nylon.

An engine, such as an internal combustion engine, may comprise the above-mentioned crankcase oil catcher. Similarly, a vehicle, such as an automobile, van or any other motor vehicle, may comprise the above-mentioned crankcase oil catcher.

BRIEF DESCRIPTION OF THE DRAWINGS

For a better understanding of the present disclosure, and to show more clearly how it may be carried into effect, reference will now be made, by way of example, to the accompanying drawings, in which:

FIGS. 1-4 are drawn approximately to scale, however other relative dimensions may be used if desired.

DETAILED DESCRIPTION

Figure 1:
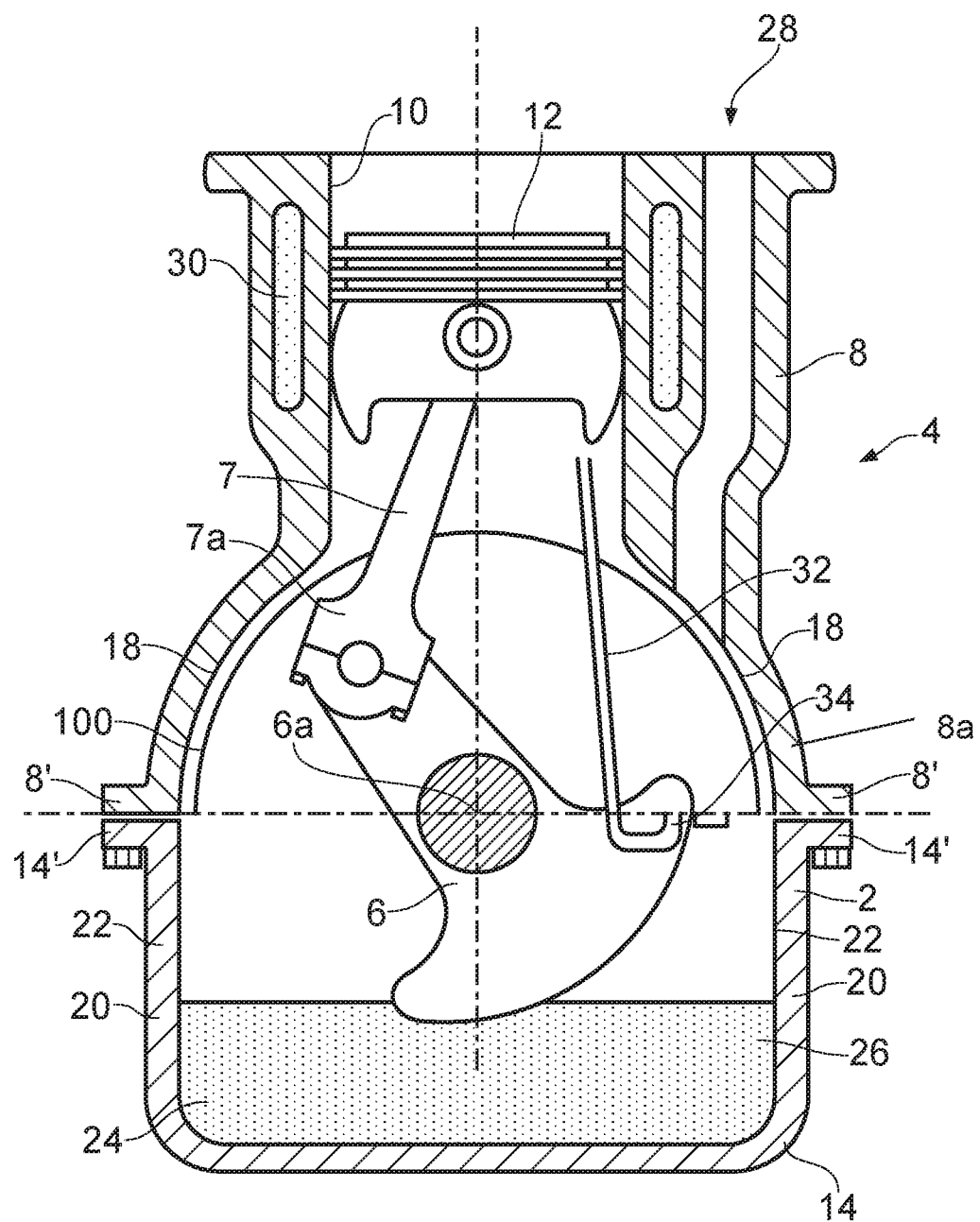
FIG. 1 shows a side sectional view of an engine in which there is provided a crankcase oil catcher according to a previously-proposed example.
Figure 2:
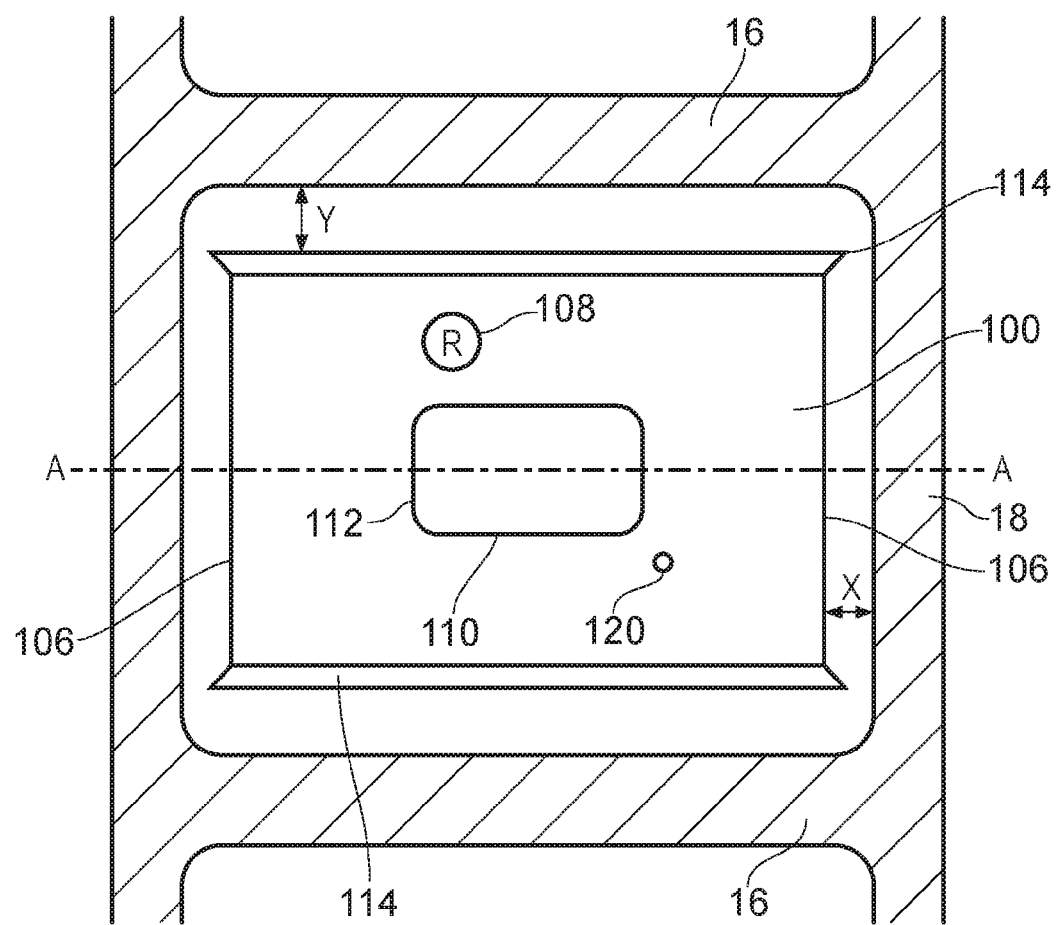
FIG. 2 shows a plan view of the crankcase oil catcher according to the previously-proposed example (the crankshaft and connecting rod have been omitted for the sake of clarity).
Figure 3:
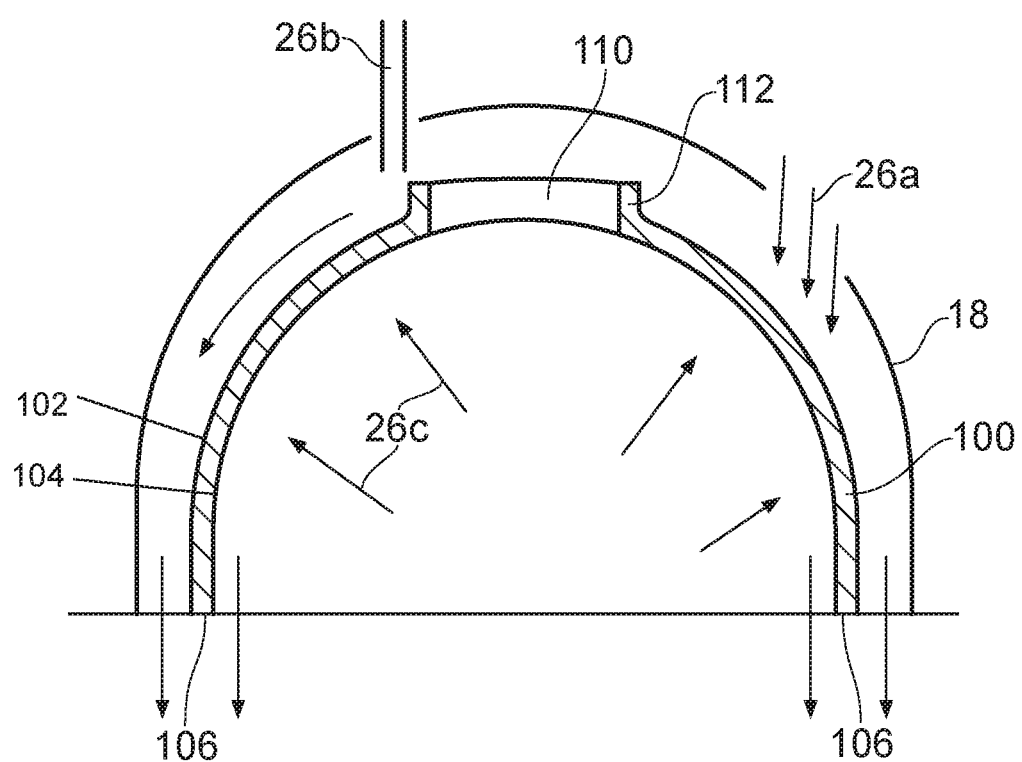
FIG. 3 shows a further side sectional view of the crankcase oil catcher according to the previously-proposed example and is taken along section A-A shown in FIG. 2 (the crankshaft and connecting rod have been omitted for the sake of clarity).

With reference to FIGS. 1 to 3, a previously-proposed arrangement comprises a crankcase oil catcher 100. The crankcase oil catcher 100 is configured for placement in a crankcase 2 of an internal combustion engine 4. The crankcase 2 forms a housing for a crankshaft 6 of the engine. As depicted, the crankcase 2 may comprise a portion 8a of a cylinder block 8, the portion 8a extending below cylinders 10 for pistons 12. The crankcase 2 is completed by a sump portion 14, which may be coupled to the cylinder block portion 8a via flanges 8', 14'. Although not shown, it will be appreciated that other arrangements may apply, for example, the crankcase and cylinder block may be integral or the crankcase and cylinder block may be separate discrete components.

As is depicted in FIG. 1, the crankcase oil catcher 100 is provided above the crankshaft 6 and below the pistons 12. Accordingly, the crankcase oil catcher is provided beneath the engine cylinders 10. Furthermore, as is shown in FIG. 2, the crankcase oil catcher 100 may be provided between walls 16. The walls 16 divide neighbouring cylinders 10 and may extend below the cylinders 10 into the crankcase 2. The walls 16 may provide supports for crankshaft bearing housings (not shown) and may be part of the cylinder block casting 8. Accordingly, one crankcase oil catcher 100 may be provided per cylinder 10 and associated piston 12. However, in alternative arrangements, the crankcase oil catcher may extend over any number of cylinders 10.

The crankcase oil catcher 100 may be spaced apart from an inner surface 18 of the crankcase 2. The inner surface 18 may be towards the top of the crankcase 2 and, in the particular example shown, the inner surface 18 may be provided on the portion 8a of cylinder block 8 that extends below cylinders 10. The crankcase oil catcher 100 may be substantially planar, e.g. plate-like, for example, with a thickness that is less than 1% of its length or width. The crankcase oil catcher 100 may lie in a plane that at least partially follows the contours of the inner surface 18 of the crankcase 2. As a result, the crankcase oil catcher 100 may be substantially parallel to the inner surface 18. The inner surface 18 and thus crankcase oil catcher 100 may trace out one or more arcs of a circle in a plane perpendicular to the crankshaft longitudinal axis 6a. The center of the circle may substantially correspond to the longitudinal axis 6a of the crankshaft, e.g. the axis about which the crankshaft rotates. By contrast, the inner surface 18 and thus crankcase oil catcher 100 may be substantially straight in a direction parallel to the crankshaft longitudinal axis 6a. As a result the crankcase oil catcher 100 may at least partially correspond to a sector of a substantially cylindrical tube.

The crankcase oil catcher 100 may fit in a space between the crankcase inner wall 18 and an arc traced out by crankshaft 6 and a big end 7a of connecting rod 7 as the crankshaft 6 rotates. As depicted in FIG. 2, a gap X, e.g. in a radial direction, may exist between the crankcase casing wall 18 and the crankcase oil catcher 100. Gap X may vary or may be substantially constant, e.g. along the surface of the crankcase oil catcher. Gap X may be between approximately 4 and 10 mm. Similarly, a gap Y may exist between the dividing walls 16 and the crankcase oil catcher 100. Gap Y may be substantially constant. Gap Y may be small, e.g. between approximately 1 and 10 mm.

As shown in FIG. 1, sump walls 20 with inner facing sump surfaces 22 may be provided below the curved inner surface 18 of the crankcase 2. The sump walls 20 may be provided either side of the crankshaft 6. The sump surfaces 22 may be substantially straight and parallel. The sump surfaces 22 may be coincident with a tangent of the inner surface 18 at the interface between the sump surfaces 22 and inner surface 18. The sump walls 20 may form part of the sump portion 14, which may or may not be integral with casing portion 8a. The sump walls 20 may define a sump 24 which contains the oil 26 in the crankcase 2.

Referring to FIG. 1, the crankcase oil catcher 100 may extend downwards to a point substantially level with the crankshaft longitudinal axis 6a. Accordingly, in the case of the crankcase oil catcher 100 substantially tracing out an arc of a circle centered about the crankshaft longitudinal axis 6a, the crankcase oil catcher 100 may subtend an angle of approximately 180°. However, in alternative arrangements the crankcase oil catcher may extend to a point above the crank longitudinal axis, e.g. the crankcase oil catcher 100 may subtend an angle of less than 180°. This may be advantageous since oil running off the oil catcher 100 may be spaced further from sump surfaces 22 as the oil falls into the sump 24. Alternatively, the crankcase oil catcher may extend to a point below the crank longitudinal axis. For example, the crankcase oil catcher may follow the sump surfaces 22, which may as depicted be substantially straight. The crankcase oil catcher may even extend into the oil sump 24, e.g. below the oil level during use.

The crankcase oil catcher 100 comprises surfaces, which are configured to catch oil dispersed in the crankcase 2 and direct the oil along the surfaces of the crankcase oil catcher away from the crankcase walls 18, 22 and towards the crank sump 24. In particular, the crankcase oil catcher 100 comprises a top surface 102, which when installed faces the piston 12. Furthermore, the crankcase oil charger 100 comprises a bottom surface 104, which when installed faces the crankshaft 6.

Referring to FIGS. 2 and 3, the crankcase oil catcher 100 may comprise a first aperture 110 for the connecting rod 7 to pass through. The width of the first aperture 110 in a direction perpendicular to the longitudinal axis 6a of the crankshaft may be smaller than the corresponding width of the associated engine cylinder 10. Additionally or alternatively, the width of the first aperture 110 in a direction parallel to the longitudinal axis 6a of the crankshaft may be smaller than the corresponding width of the associated engine cylinder 10. As a result, oil falling down the side of cylinder 10 will be caught by the crankcase oil catcher 100.

As shown in FIG. 3, the crankcase oil catcher 100 may comprise a first lip 112 provided around an edge defining the first aperture 110. The first lip 112 may protrude from the top surface 102 of the crankcase oil catcher and may protrude in a direction towards the piston 12. The first lip 112 may prevent oil on the top surface 102 from falling through the first aperture 110.

As shown in FIG. 2, the crankcase oil catcher 100 may comprise a pair of second lips 114. The second lips 114 may be provided on edges of the crankcase oil catcher that are adjacent to the walls 16 between neighbouring cylinders 10. Accordingly, the second lips 114 may be provided on the two edges of the crankcase oil catcher that are substantially perpendicular to the crankshaft longitudinal axis 6a. The second lips 114 may protrude above the top surface 102. As a result, the second lips 114 may prevent oil on the top surface 102 from falling over the edge adjacent to walls 16.

As depicted in FIGS. 1 and 2, the crankcase oil catcher 100 may comprise a second aperture 120 for a piston cooling jet 32 to pass through. The piston cooling jet 32 may be delivered from an oil duct 34 which directs the jet of oil 32 through the second aperture 120 and towards the piston 12. Alternatively, the duct for delivering the cooling jet 32 may extend through the second aperture 120. As for the first aperture 110, an upwardly projecting lip (not shown) may be provided around an edge defining the second aperture 120.

Referring to FIGS. 1 and 3, the top surface 102 may be configured to catch oil returning from above the crankcase, such as oil 26a returning from a cylinder head through passage 28 and/or oil 26b returning from the cylinder 10, e.g. from a piston cooling gallery 30 disposed about the cylinder 10. Accordingly, the crankcase oil catcher 100 may extend over the cylinder head oil drain passage 28 and/or a piston cooling gallery drain passage (not shown). For example, oil returning from the piston cooling gallery 30 may flow onto the top surface 102 at a point 108 on the top surface. Oil collected on the top surface 102 may then flow along the top surface by virtue of gravity. The oil may flow until it reaches a bottom edge 106 of the crankcase oil catcher 100 at which point the oil falls into the sump 24.

The bottom surface 104 may be configured to catch oil 26c dispersed by the crankshaft 6 and/or by the connecting rod big end 7a, e.g. as they pass through the oil 26 in the sump 24. Oil collected on the bottom surface 104 may then flow along the bottom surface by virtue of gravity and the oil's surface tension. The oil may flow until it reaches the bottom edge 106 of the crankcase oil catcher 100 at which point the oil falls into the sump 24.

In either case, the top and bottom surfaces 102, 104 may prevent oil returning to the sump 24 from contacting the crankcase walls 18, 16, 20, thereby minimizing the heat lost by the oil to the crankcase 2. Furthermore, oil returning from above the crankcase may be prevented from simply falling directly into the crankcase, hitting the crankshaft or connecting rod and being flung out to the casing walls.

In addition, the crankcase oil catcher 100 and the air gap between the crankcase oil catcher 100 and crankcase inner surface 18 will act as thermal insulation barrier. The motion of the crankshaft 6 and connecting rods 7 creates a rotating flow of gas with an oil mist in the crankcase. Such a flow results in additional heat loss due to forced convection from the hot gases to the colder crankcase wall. Therefore, by adding the oil catcher 100 and the air gap between it and the inner surface 18, the amount of conduction and forced heat convection from the gas motion, as well as heat loss from the hot oil, will be reduced.

The crankcase oil catcher 100 may be molded or bent into shape during construction. Furthermore, the crankcase oil catcher 100 may be made from a low conducting thermally insulating material, for example, a plastics material, such as nylon. The selection of such a material would minimize the thermal energy transferred from the oil falling on the crankcase oil catcher 100. In addition, although not shown, the crankcase oil catcher may be connected to the crankcase casing wall 18 via one or more thermally insulating couplings and such couplings may be made from a plastics material, e.g. nylon. The couplings may comprise a fir tree type fitting, screws or any other suitable coupling. The couplings may be received in openings in the crankcase wall 18. The crankcase oil catcher may additionally or alternatively comprise flanges (not shown), which may for example fit between flanges 8', 14' of the cylinder block portion 8a and sump portion 14 to hold the crankcase oil catcher in place.

Figure 4:
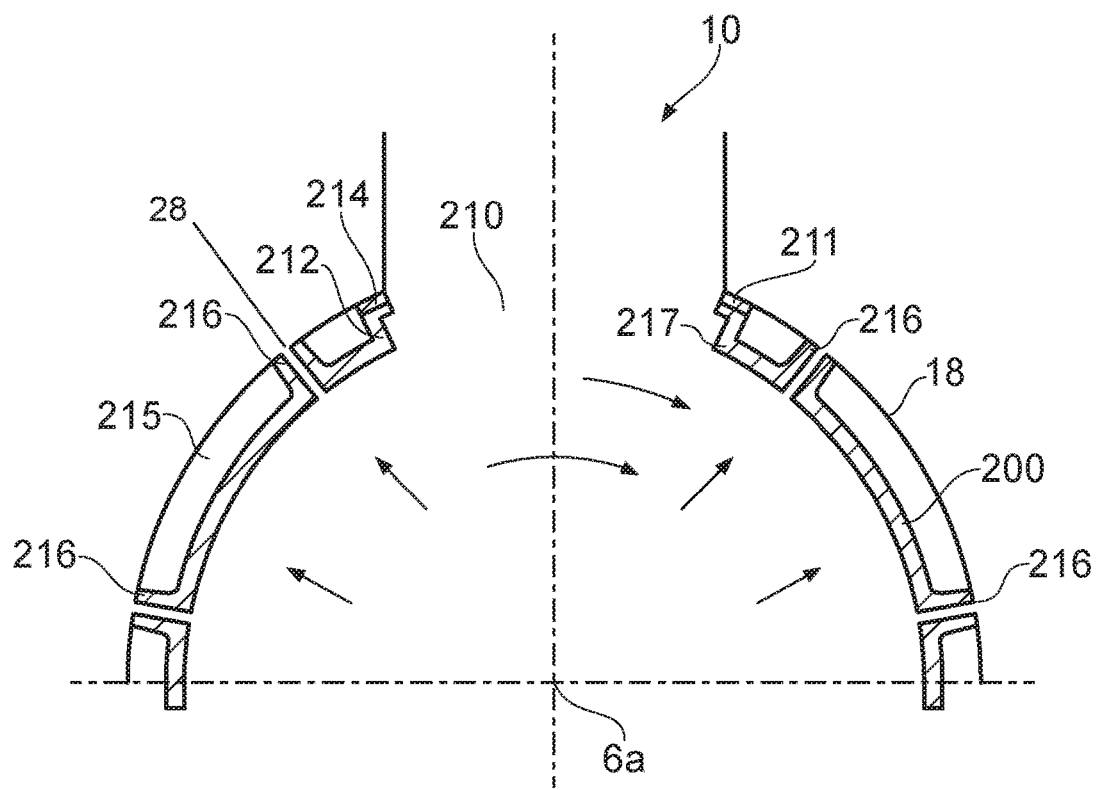
FIG. 4 shows a side sectional view of the crankcase oil catcher according to an example of the present disclosure and corresponds to the view shown in FIG. 3 for the previously-proposed example (the crankshaft and connecting rod have been omitted for the sake of clarity).

FIG. 4 shows a crankcase oil catcher 200 according to an example of the present disclosure. The cranckcase oil catcher 200 is similar to the above-described crankcase oil catcher 100 and features described above in respect of the crankcase oil catcher 100 may apply equally to the crankcase oil catcher 200. In other words, the crankcase oil catcher 200 may replace the crankcase oil catcher 100. For example, the crankcase oil catcher 200 is configured to be provided between the crankshaft 6 and the engine cylinder 10 with its associated piston 12. Accordingly, the crankcase oil catcher 200 comprises a first aperture 210 for the connecting rod 7 of the associated piston 12 to pass through.

A seal 211 may be provided around the first aperture 210 on the side of the crankcase oil catcher that faces the crankcase casing wall 18. The seal 211 may be configured to seal against the crankcase casing wall 18 around an opening in the crankcase casing wall where the engine cylinder 10 meets the crankcase casing wall. The seal 211 may provide a seal between the engine cylinder and a gap 215 between the crankcase oil catcher and the crankcase casing wall 18.

In contrast to the oil catcher 100, the crankcase oil catcher 200 may not necessarily extend directly below the cylinder bore 10. In other words, the width of the first aperture 210 in a direction perpendicular and/or parallel to a longitudinal axis 6a of the crankshaft may be equal to or greater than the corresponding width of the associated engine cylinder 10. Accordingly, the crankcase oil catcher 200 may still catch oil being thrown out by the crankshaft 6, as well as oil returning from the drain passage 28, piston cooling gallery, turbo or crankcase ventilation returns, but not necessarily oil from the underside of the piston 12.

The crankcase oil catcher 200 may comprise a first lip 212 disposed about an edge 217 defining the first aperture 210. The first lip 212 may protrude from a top surface of the crankcase oil catcher 200 in a direction towards the cylinder 10. The crankcase oil catcher 200 may comprise a sealant 214, e.g. a bead of sealant, applied around the edge 217 defining the first aperture 210. The sealant 214 may be applied onto the first lip 212 and the sealant 214 may contact the crankcase casing wall 18. The sealant 214 and first lip 212 may thus together form the seal 211.

In an alternative arrangement, the sealant may be omitted and the first lip 212 may contact the crankcase casing wall 18 directly thus forming the seal. In a further alternative arrangement, the first lip may be omitted and the sealant 214 may alone form the seal 211.

However the seal 211 is formed, the seal 211 may prevent air in the gap 215 from being pulsed by air motion generated by the piston 12 moving up and down in cylinder 10. In this manner, the air in gap 215 will be relatively stagnant and it will therefore give a good thermal resistance to reduce the heat transfer to the crankcase wall 18.

The crankcase oil catcher 200 may comprise one or more fixing mounts 216 that span the gap 215 and allow the crankcase oil catcher 200 to be affixed to the crank case casing wall 18. The fixing mounts 216 are shown in the cross-sectional view of FIG. 4, but they may not be present in all cross-sections, e.g. such that oil from the drain passage 28 or piston cooling gallery can flow around the fixing mounts 216.

The crankcase oil catcher 200 may be made from a low conducting thermally insulating material, for example, a plastics material, such as nylon. The crankcase oil catcher 200 may alternatively be made at least in part from a closed cell foam material.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the disclosure has been described by way of example with reference to one or more examples, it is not limited to the disclosed examples and that alternative examples could be constructed without departing from the scope of the disclosure as defined by the appended claims.

The invention claimed is:

1. A crankcase oil catcher configured to be provided above a crankshaft of an engine and below an associated piston, the crankcase oil catcher comprising:
   one or more surfaces configured to catch dispersed oil in a crankcase and direct the oil along the surfaces of the crankcase oil catcher away from a crankcase casing wall and towards a crank sump;
   a first aperture for a connecting rod of the associated piston to pass through; and
   a seal provided around the first aperture, wherein the seal is configured to seal against the crankcase casing wall around an opening into an engine cylinder in which the associated piston resides and provide a seal between the engine cylinder and a gap between the crankcase oil catcher and the crankcase casing wall,
   wherein the crankcase oil catcher further comprises one or more fixing mounts that span the gap.

2. The crankcase oil catcher as claimed in claim 1, wherein the width of the first aperture in a direction perpendicular and/or parallel to a longitudinal axis of the crankshaft is equal to or greater than the corresponding width of the associated engine cylinder.

3. The crankcase oil catcher as claimed in claim 1, wherein the crankcase oil catcher comprises a first lip disposed about the first aperture and the first lip at least partially forms the seal.

4. The crankcase oil catcher as claimed in claim 1, wherein the crankcase oil catcher comprises a sealant applied around the first aperture and the sealant at least partially forms the seal.

5. The crankcase oil catcher of claim 4, wherein the sealant is applied onto the first lip.

6. The crankcase oil catcher as claimed in claim 1, wherein the crankcase oil catcher is configured to be spaced apart from the crankcase casing wall.

7. The crankcase oil catcher as claimed in claim 1, wherein the crankcase oil catcher is configured to substantially follow the contour of the crankcase casing wall.

8. The crankcase oil catcher as claimed in claim 7, wherein the crankcase oil catcher is configured to substantially follow the contour of the crankcase casing wall in a plane perpendicular to a longitudinal axis of a crankshaft extending through the crankcase.

9. The crankcase oil catcher as claimed in claim 7, wherein a gap between the crankcase casing wall and the crankcase oil catcher is between 4 and 10 mm.

10. The crankcase oil catcher as claimed in claim 1, wherein the crankcase oil catcher is configured to be provided for a single cylinder of the engine.

11. The crankcase oil catcher as claimed in claim 1, wherein the crankcase oil catcher is configured to be provided between walls between neighboring cylinders of the engine.

12. The crankcase oil catcher as claimed in claim 1, wherein the crankcase oil catcher comprises one or more second lips provided on one or more edges of the crankcase oil catcher surfaces.

13. The crankcase oil catcher as claimed in claim 12, wherein the one or more second lips are provided on edges of the crankcase oil catcher surfaces adjacent to the walls between neighboring cylinders of the engine.

14. The crankcase oil catcher as claimed in claim 12, wherein the one or more second lips are provided on edges of the crankcase oil catcher surfaces substantially perpendicular to a longitudinal axis of a crankshaft extending through the crankcase.

15. The crankcase oil catcher as claimed in claim 1, wherein the crankcase oil catcher comprises a bottom surface, the bottom surface being configured to catch oil dispersed by a crankshaft and/or by a bearing between the crankshaft and a connecting rod.

16. The crankcase oil catcher as claimed in claim 1, wherein the crankcase oil catcher comprises a top surface, the top surface being configured to catch oil returning from above the crankcase.

17. The crankcase oil catcher as claimed in claim 1, wherein the crankcase oil catcher is made from a low conducting thermally insulating material with a thermal conductivity such that less heat is transferred from the oil on the crankcase oil catcher than would otherwise have been transferred to the crankcase casing wall.

18. The crankcase oil catcher as claimed in claim 1, wherein the crankcase oil catcher is made at least in part from a plastics material.

19. The crankcase oil catcher as claimed in claim 1, wherein the crankcase oil catcher is made at least in part from nylon.

20. The crankcase oil catcher as claimed in claim 1, wherein the crankcase oil catcher is made at least in part from a closed cell foam material.

* * * * *